United States Patent
Lowles et al.

(10) Patent No.: US 8,866,743 B2
(45) Date of Patent: Oct. 21, 2014

(54) NAVIGATIONAL TOOL WITH DRAG-BASED TACTILE FEEDBACK ON A HANDHELD WIRELESS COMMUNICATION DEVICE

(75) Inventors: Robert J. Lowles, Waterloo (CA); Jason T. Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 1183 days.

(21) Appl. No.: 11/778,197

(22) Filed: Jul. 16, 2007

(65) Prior Publication Data
US 2009/0023478 A1    Jan. 22, 2009

(51) Int. Cl.
*G09G 5/00* (2006.01)
*G06F 3/01* (2006.01)

(52) U.S. Cl.
CPC .................... *G06F 3/016* (2013.01)
USPC ............ 345/163; 345/164; 345/156; 368/255

(58) Field of Classification Search
CPC ........................ G06F 3/016; G09F 2203/014
USPC .......... 345/163, 164, 156; 335/207; 710/72; 463/38; 368/255
See application file for complete search history.

(56) References Cited

U.S. PATENT DOCUMENTS

| | | | |
|---|---|---|---|
| 4,868,549 A * | 9/1989 | Affinito et al. .............. 345/164 |
| 6,062,139 A | 5/2000 | Tomita et al. |
| 6,468,158 B1 * | 10/2002 | Ootori et al. .................... 463/38 |
| 6,885,615 B1 * | 4/2005 | Miyazawa et al. ............ 368/255 |
| 6,922,123 B2 | 7/2005 | Lalonde |
| 7,196,688 B2 * | 3/2007 | Schena ......................... 345/156 |
| 2002/0054060 A1 | 5/2002 | Schena |
| 2004/0164963 A1 * | 8/2004 | Ono et al. ..................... 345/167 |
| 2005/0091431 A1 * | 4/2005 | Olodort et al. ................ 710/72 |
| 2006/0033716 A1 * | 2/2006 | Rosenberg et al. ............ 345/163 |
| 2006/0208840 A1 * | 9/2006 | Naka et al. .................... 335/207 |

FOREIGN PATENT DOCUMENTS

| DE | 10332614 A1 | 2/2005 |
|---|---|---|
| EP | 0489469 A | 6/1992 |
| EP | 1378856 A | 1/2004 |

OTHER PUBLICATIONS

European Search Report 07112546 mailed Jun. 20, 2008.
Office Action dated Oct. 13, 2010. In corresponding Canadian application No. 2,637,554.
Office Action mailed Jan. 15, 2013, in corresponding Canadian patent application No. 2,637,554.
Notice of Allowance and Fee(s) Due mailed Jun. 7, 2010. In corresponding application No. 07112546.2.
Office Action mailed Jan. 31, 2011. In corresponding Canadian patent application No. 2,637,554.
Examination report mailed Feb. 1, 2010. In corresponding European patent application No. 07112546.2.
Office Action mailed Feb. 20, 2014; in corresponding Canadian patent application No. 2,637,554.

* cited by examiner

*Primary Examiner* — Amare Mengistu
*Assistant Examiner* — Joseph G Rodriguez
(74) *Attorney, Agent, or Firm* — Novak Druce Connolly Bove + Quigg LLP (57) ABSTRACT

A wireless handheld communication device features a rotational navigation tool assembly such as a trackball or a thumbwheel. The rotational navigation tool assembly provides a user with tactile feedback corresponding to motion of a selection or position indicator on the device display. The tactile feedback is electromagnetically induced and may, for example, be considered an electromagnetic detent.

37 Claims, 7 Drawing Sheets

|   | 1 | 2 | 3 | 4 | 5 | 6 | 7 | 8 | 9 | 0 |
|---|---|---|---|---|---|---|---|---|---|---|
| 44a → | Q | W | E | R | T | Y | U | I | O | P |
|   | A | S | D | F | G | H | J | K | L |   |
|   | Z | X | C | V | B | N | M |   |   |   |

FIG. 3

|   | 1 | 2 | 3 | 4 | 5 | 6 | 7 | 8 | 9 | 0 |
|---|---|---|---|---|---|---|---|---|---|---|
| 44b → | Q | W | E | R | T | Z | U | I | O | P |
|   | A | S | D | F | G | H | J | K | L |   |
|   | Y | X | C | V | B | N | M |   |   |   |

FIG. 4

|   | 1 | 2 | 3 | 4 | 5 | 6 | 7 | 8 | 9 | 0 |
|---|---|---|---|---|---|---|---|---|---|---|
| 44c → | A | Z | E | R | T | Y | U | I | O | P |
|   | Q | S | D | F | G | H | J | K | L |   |
|   | W | X | C | V | B | N | M |   |   |   |

FIG. 5

| 1 | 2 | 3 | 4 | 5 | 6 | 7 | 8 | 9 | 0 |
|---|---|---|---|---|---|---|---|---|---|
|   |   |   | P | Y | F | G | C | R | L |
| A | O | E | U | I | D | H | Y | N | S |
|   |   | Q | J | K | X | B | M | W | V | Z |

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L |   |
| Z | X | C | V | B | N | M |   |   |   |

44

| 7 | 8 | 9 |
|---|---|---|
| 4 | 5 | 6 |
| 1 | 2 | 3 |
| 0 |   |   |

| 1 | 2 | 3 |
|---|---|---|
| 4 | 5 | 6 |
| 7 | 8 | 9 |
| * | 0 | # |

42, 43

| 1 | 2 abc | 3 def |
|---|---|---|
| 4 ghi | 5 jkl | 6 mno |
| 7 pqrs | 8 tuv | 9 wxyz |
| * shift | 0 | # space |

NAVIGATIONAL TOOL WITH DRAG-BASED TACTILE FEEDBACK ON A HANDHELD WIRELESS COMMUNICATION DEVICE

FIELD

This disclosure relates to wireless handheld electronic communication devices. More particularly, it relates to rotational navigation tools used on such devices, which rotational navigation tools have tactile user feedback.

BACKGROUND

With the proliferation of wireless communications systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

For many reasons, screen icons are often utilized in such handheld communication devices as a way to allow users to make feature and/or function selections. Among other reasons, users are accustomed to such icon representations for function selection. A prime example is the personal computer "desktop" presented by Microsoft's Windows® operating system. Because of the penetration of such programs into the user markets, most electronics users are familiar with what has basically become a convention of icon-based functionality selections. Even with many icons presented on a personal computer's "desktop", however, user navigation and selection among the different icons is easily accomplished utilizing a conventional mouse and employing the point-and-click methodology. The absence of such a mouse from these handheld wireless communication devices, however, has necessitated that mouse substitutes be developed for navigational purposes. Mouse-type functionalities are needed for navigating and selecting screen icons, for navigating and selecting menu choices in "drop down" type menus, and also for just moving a "pointer" type cursor across the display screen.

Today, mouse substitutes in handheld wireless communication devices take the form of rotatable thumb wheels, joysticks, touchpads, four-way cursors, and the like. In the present description, a trackball is also disclosed as a screen navigational tool. It is known to provide navigation tools such as the rotatable thumb wheel with a mechanically created ratchet-feeling effect that provides the user tactile feedback when rotating the navigation tool. This feedback provides the user with additional sensory information besides the induced visible motion on the display screen. In typical trackball assemblies, however, the trackball freely rotates within a receiving socket. Therefore, because of the many different directions within which freedom of movement is possible with a trackball, it is much more difficult to effect in a trackball a ratchet feeling similar to that provided in a thumb wheel, which rotates about a single fixed axis. The benefit of such ratchet-type, incremental feedback is, however, still desired for trackball implementations.

BRIEF DESCRIPTION OF THE DRAWINGS

Exemplary apparatus constructed according to the disclosure are depicted in the accompanying drawings, wherein.

DETAILED DESCRIPTION

In general, as used herein, the term "handheld electronic device" 300 describes a relatively small device that is capable of being held in a user's hand. It is a broad term that includes devices that are further classified as handheld communication devices, which interact with communication networks 319 (FIGS. 1 and 2).

Figure 2:
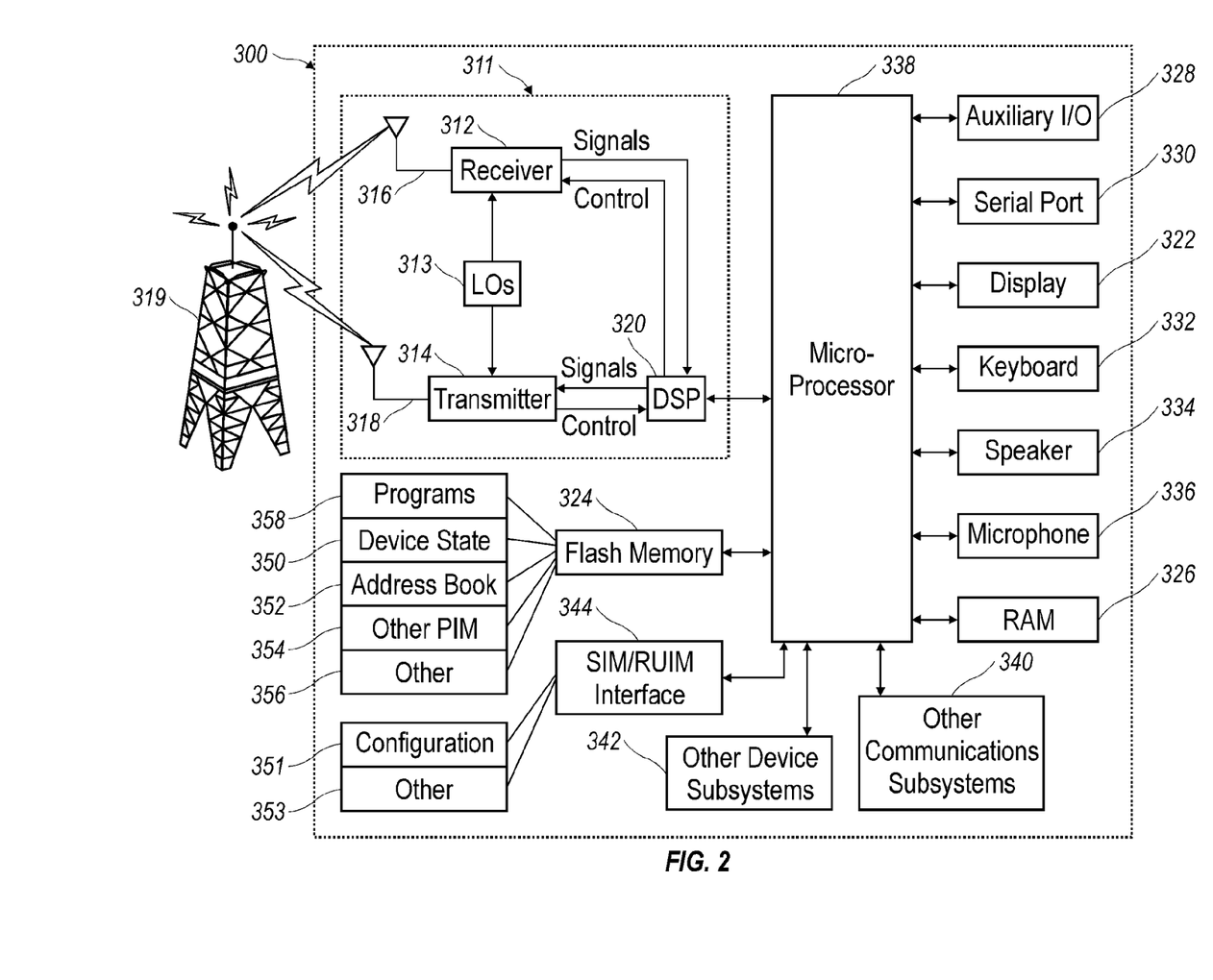
FIG. 2 is a block diagram representing a wireless handheld communication device interacting in a communication network.

When cooperating in a communications network 319 as depicted in FIG. 2, the handheld device 300 wirelessly transmits data to and receives data from a communication network 319 utilizing radio frequency signals. Preferably, the data transmitted between the handheld device 300 and the communication network 319 supports voice and textual messaging.

Figure 1:
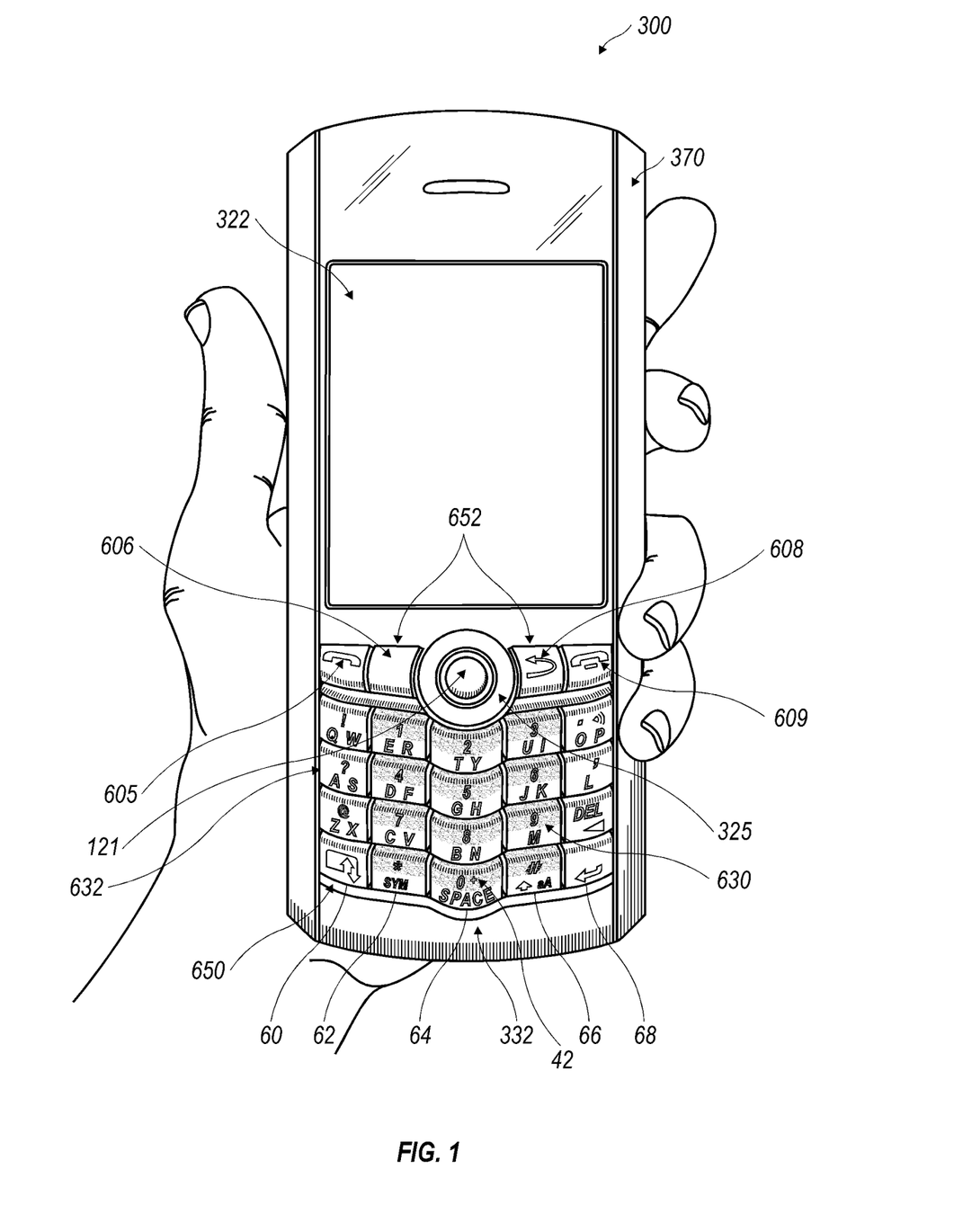
FIG. 1 illustrates a handheld electronic device configured according to the present teachings cradled in the palm of a user's hand.

As may be appreciated from FIG. 1, the handheld electronic device 300 comprises a display 322 located above a keyboard 332 suitable for accommodating textual input to the handheld electronic device 300 when in an operable configuration. As shown, the handheld electronic device 300 is of unibody construction, but it is also contemplated that the handheld electronic device 300 may be of an alternative construction such as that commonly known as "clamshell" or "flip-phone" style. Regardless, in the operable configuration of the handheld electronic device 300, an auxiliary input 328, such as a navigational tool, may be located essentially between the display 322 and the keyboard 332. Examples and details regarding exemplary navigational tools are provided below.

In one embodiment, the keyboard 332 comprises a plurality of keys with which alphabetic letters are associated on a one-letter-per-key basis. It is contemplated that the keys may be directly marked with letters, or the letters may be presented adjacent to the keys but with each letter clearly in association with a particular key. In order to facilitate user input, the alphabetic letters are preferably configured in a familiar QWERTY, QWERTZ, AZERTY, or Dvorak layout, each of which is also discussed in greater detail hereinbelow.

In an alternative configuration, the keyboard 332 comprises a plurality of keys with which alphabetic letters are also associated, but at least a portion of the individual keys have multiple letters associated therewith. This type of configuration is referred to as a reduced keyboard (in comparison to the full keyboard described immediately above) and can, among others, come in QWERTY, QWERTZ, AZERTY, and Dvorak layouts.

An exemplary embodiment of the handheld electronic device 300 as shown in FIG. 1 is cradleable in the palm of a user's hand. The size of the device 300 is such that a user is capable of operating the device 300 using the same hand that is holding the device 300. In a preferred embodiment, the user is capable of actuating all features of the device 300 using the thumb of the cradling hand, while in other embodiments, features may require the use of more than just the thumb of the cradling hand. The preferred embodiment of the handheld device 300 features a keyboard 332 on the face of the device 300, which is actuable by the thumb of the hand cradling the device 300. The user may also hold the device 300 in such a manner to enable two thumb typing on the device 300. Furthermore, the user may use fingers rather than thumbs to actuate the keys on the device 300. In order to accommodate palm-cradling of the device 300 by the average person, the device is preferably longer (height as shown in FIG. 1) than it is wide, and the width is preferably between approximately fifty and seventy-six millimeters (two and three inches), but by no means limited to such dimensions.

The handheld electronic device 300 includes an input portion and an output display portion. The output display portion can be a display screen 322, such as an LCD or other similar display device.

The input portion includes a plurality of keys that can be of a physical nature such as actuable buttons, or they can be of a software nature, typically constituted by virtual representations of physical keys on a display screen 322 (referred to herein as "software keys"). It is also contemplated that the user input can be provided as a combination of the two types of keys. Each key of the plurality of keys has at least one actuable action, which can be the input of a character, a command, or a function. In this context, "characters" are contemplated to exemplarily include alphabetic letters, language symbols, numbers, punctuation, insignias, icons, pictures, and even a blank space. Input commands and functions can include such things as delete; backspace; moving a cursor up, down, left, or right; initiating an arithmetic function or command; initiating a command or function specific to an application program or feature in use; initiating a command or function programmed by the user; and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s), and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen 322, a current indicia for the key may be temporarily shown nearby the key on the screen 322.

In the case of software keys, the indicia for the respective keys are shown on the display screen 322, which in one embodiment is enabled by touching the display screen 322, for example, with a stylus to generate the character or activate the indicated command or function. Such display screens 322 may include one or more touch interfaces, including a touchscreen. A non-exhaustive list of touchscreens includes, for example, resistive touchscreens, capacitive touchscreens, projected capacitive touchscreens, infrared touchscreens, and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Thus, the desired character, command, or function is obtained by depressing the physical key corresponding to the character, command, or function displayed at a corresponding position on the display screen 322 rather than touching the display screen 322. To aid the user, indicia for the characters, commands, and/or functions most frequently used are preferably positioned on the physical keys and/or on the area around or between the physical keys. In this manner, the user can more readily associate the correct physical key with the character, command, or function displayed on the display screen 322.

Figure 3:
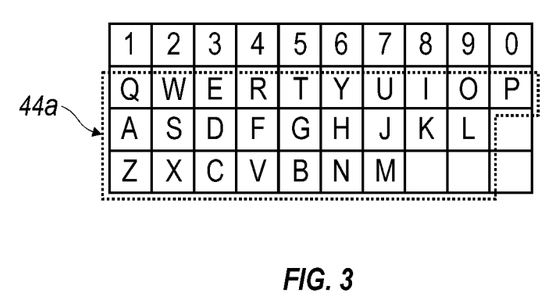
FIG. 3 illustrates an exemplary QWERTY keyboard layout.
Figure 4:
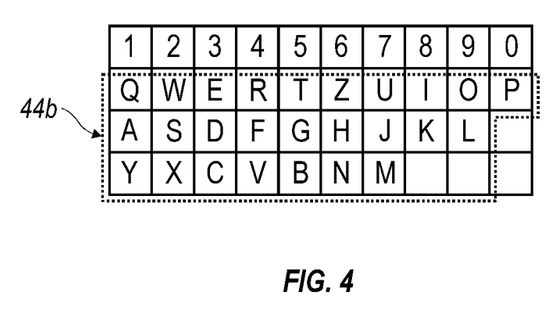
FIG. 4 illustrates an exemplary QWERTZ keyboard layout.
Figure 5:
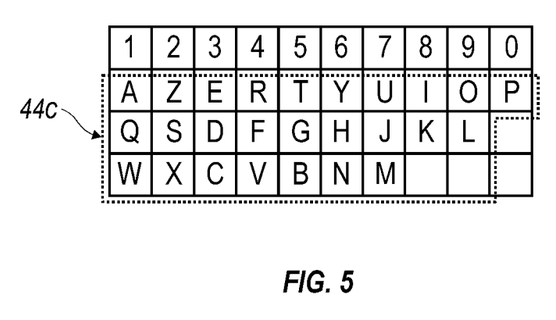
FIG. 5 illustrates an exemplary AZERTY keyboard layout.
Figure 6:
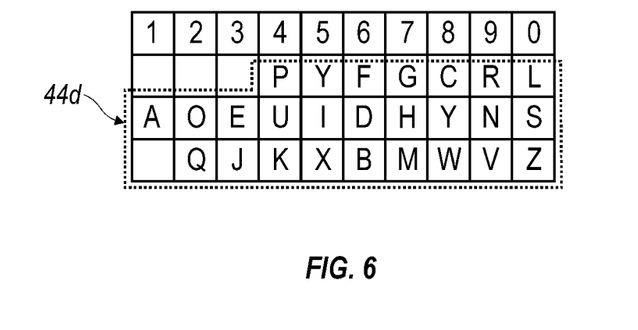
FIG. 6 illustrates an exemplary Dvorak keyboard layout.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44*a* shown in FIG. 3. The QWERTZ keyboard layout is normally used in German-speaking regions; this alphabetic key arrangement 44*b* is shown in FIG. 4. The AZERTY keyboard layout 44*c* is normally used in French-speaking regions and is shown in FIG. 5. The Dvorak keyboard layout was designed to allow typists to type faster; this alphabetic key arrangement 44*d* is shown in FIG. 6.

Figure 7:
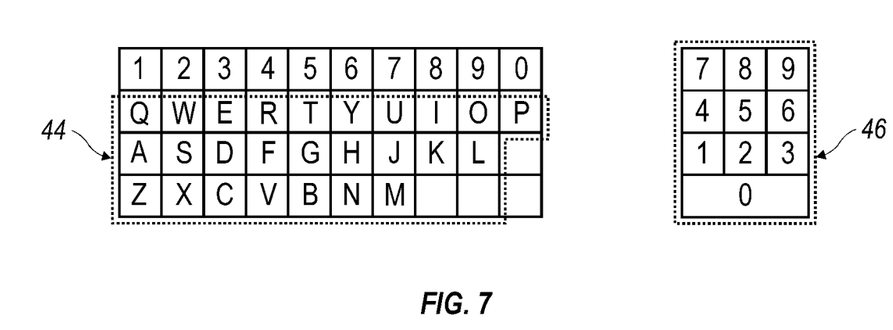
FIG. 7 illustrates a QWERTY keyboard layout paired with a traditional ten-key keyboard.

Alphabetic key arrangements in full keyboards and typewriters are often presented along with numeric key arrangements. An exemplary numeric key arrangement is shown in FIGS. 3-6, where the numbers 1-9 and 0 are positioned above the alphabetic keys. In another known numeric key arrangement, numbers share keys with the alphabetic characters, such as the top row of the QWERTY keyboard. Yet another exemplary numeric key arrangement is shown in FIG. 7, where a numeric keypad 46 is spaced from the alphabetic/numeric key arrangement. The numeric keypad 46 includes the numbers "7", "8", "9" arranged in a top row, "4", "5", "6"

arranged in a second row, "1", "2", "3" arranged in a third row, and "0" in a bottom row, consistent with what may be found on a known "ten-key" computer keyboard keypad. Additionally, a numeric phone key arrangement 42 is also known, as shown in FIG. 8.

Figure 8:
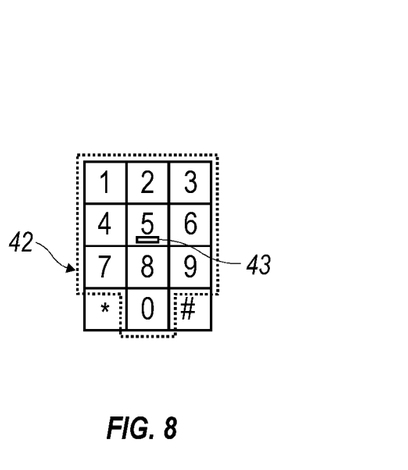
FIG. 8 illustrates ten digits comprising the numerals 0-9 arranged in a traditional ITU Standard E 1.161 numeric telephone keypad layout, including the * and # flanking the 0 key.
Figure 9:
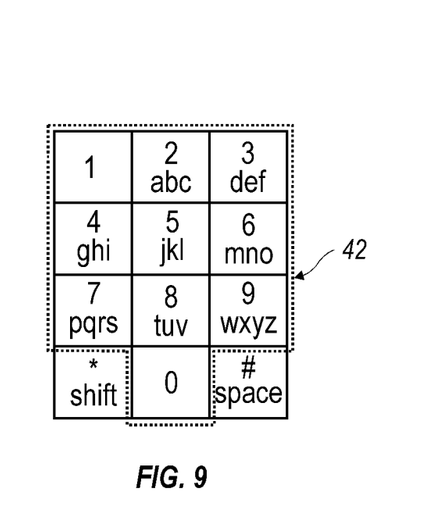
FIG. 9 illustrates a traditional or standard phone key arrangement or layout according to the ITU Standard E 1.161 including both numerals and letters.

As shown in FIG. 8, the numeric phone key arrangement 42 may also utilize a surface treatment on the surface of the center "5" key. This surface treatment is such that the surface of the key is distinctive from the surface of other keys. Preferably the surface treatment is in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key, as known by those of skill in the art.

Handheld electronic devices 300 that include a combined text-entry keyboard and a telephony keyboard are also known. Examples of such mobile communication devices include mobile stations, cellular telephones, wireless personal digital assistants (PDAs), two-way paging devices, and others. Various keyboards are used with such devices depending in part on the physical size of the handheld electronic device 300. Some of these are termed full keyboard, reduced keyboard, and phone key pads.

In embodiments of a handheld electronic device 300 having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, with the QWERTY keyboard layout being the most common.

In order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the microprocessor 338 of these types of handheld electronic devices 300 to determine or predict what letter or word has been intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage.

The software preferably also has the ability to recognize character letter sequences that are common to the particular language, such as, in the case of English, words ending in "ing." Such systems can also "learn" the typing style of the user making note of frequently used words to increase the predictive editor aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

The multi-tap method of character selection has been in use a number of years for permitting users to enter text using a touch screen device or a conventional telephone key pad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

A "text on nine keys"-type system uses predictive letter patterns to allow a user to ideally press each key representing a letter only once to enter text. Unlike multi-tap, which requires a user to indicate a desired character by a precise number of presses of a key or keystrokes, the "text-on-nine-keys" system uses a predictive text dictionary and established letter patterns for a language to intelligently guess which one of many characters represented by a key that the user intended to enter. The predictive text dictionary is primarily a list of words, acronyms, abbreviations, and the like that can be used in the composition of text.

Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence, which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIG. 1 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 include a color scheme that is different from that of the remaining keys associated with the QWERTY key arrangement. As exemplified in FIG. 1, a color scheme of the numeric phone keys has a two tone appearance, with the upper portion of the numeric keys being a first color and the lower portion of the numeric keys being a second color. The first color may be lighter than the second color, or darker than the second color.

As described above, the International Telecommunications Union ("ITU") has established phone standards for the arrangement of alphanumeric keys. The standard phone numeric key arrangement shown in FIGS. 10 (no alphabetic letters) and 11 (with alphabetic letters) corresponds to ITU Standard E 1.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 1, the numeric key arrangement can be overlaid on a QWERTY arrangement. The numeric arrangement as shown can be aptly described as a top-to-bottom ascending order three-by-three over zero pattern.

As noted earlier, multi-tap software has been in use for a number of years permitting users to enter text using a conventional telephone key pad such as specified under ITU E 1.161 or on a touch screen display, among other devices. Multi-tap requires a user to press a key a varying number of times, generally within a limited period of time, to input a specific letter associated with the particular key, thereby spelling the desired words of the message. A related method is the long tap method, where a user depresses the key until the desired character appears on the display.

As may be appreciated from FIG. 1, the handheld device 300 comprises a lighted display 322 located above a keyboard 332 suitable for accommodating textual input to the handheld device 300 when in an operable configuration. The front face 370 of the device has a keyfield 650 that includes menu keys 652, alphanumeric keys 630, alphabetic keys 632, numeric keys 42, and other function keys as shown in FIG. 1. As shown, the device 300 is of unibody construction, also known as a "candy-bar" design.

From FIG. 1 it is further evident that a plurality of the keys of the key field are arranged in rows and columns and at least one of the rows and columns is arranged with a long axis thereof substantially radially oriented relative to the trackball navigation tool. A horizontal long axis of the menu keys 606, 608 and telephone call keys 605, 609 substantially intersects a center of the trackball navigation tool 325 thereby establishing a radial orientation of at least a portion of the keys, to the trackball navigation tool 325.

Referring again to FIG. 1, the handheld device 300 is also configured to send and receive voice communications such as mobile telephone calls. At least one key of the key field 650 is positioned adjacent to the trackball navigation tool and that key has a circular arc-shaped edge conformance fitting to a circular arc-shaped boundary about the trackball navigation tool 325. To facilitate telephone calls, two call keys 605, 609 oppositely and laterally flank the trackball navigation tool. One of the two call keys is a call initiation key 605 and the other is a call termination key 609.

An exemplary handheld electronic device is shown in FIG. 1, and its integration into and use in a wireless network is exemplified in the block diagram of FIG. 2. These figures are exemplary only, and those persons skilled in the art will appreciate the additional elements and modifications necessary to make the device work in particular network environments.

Figure 10:
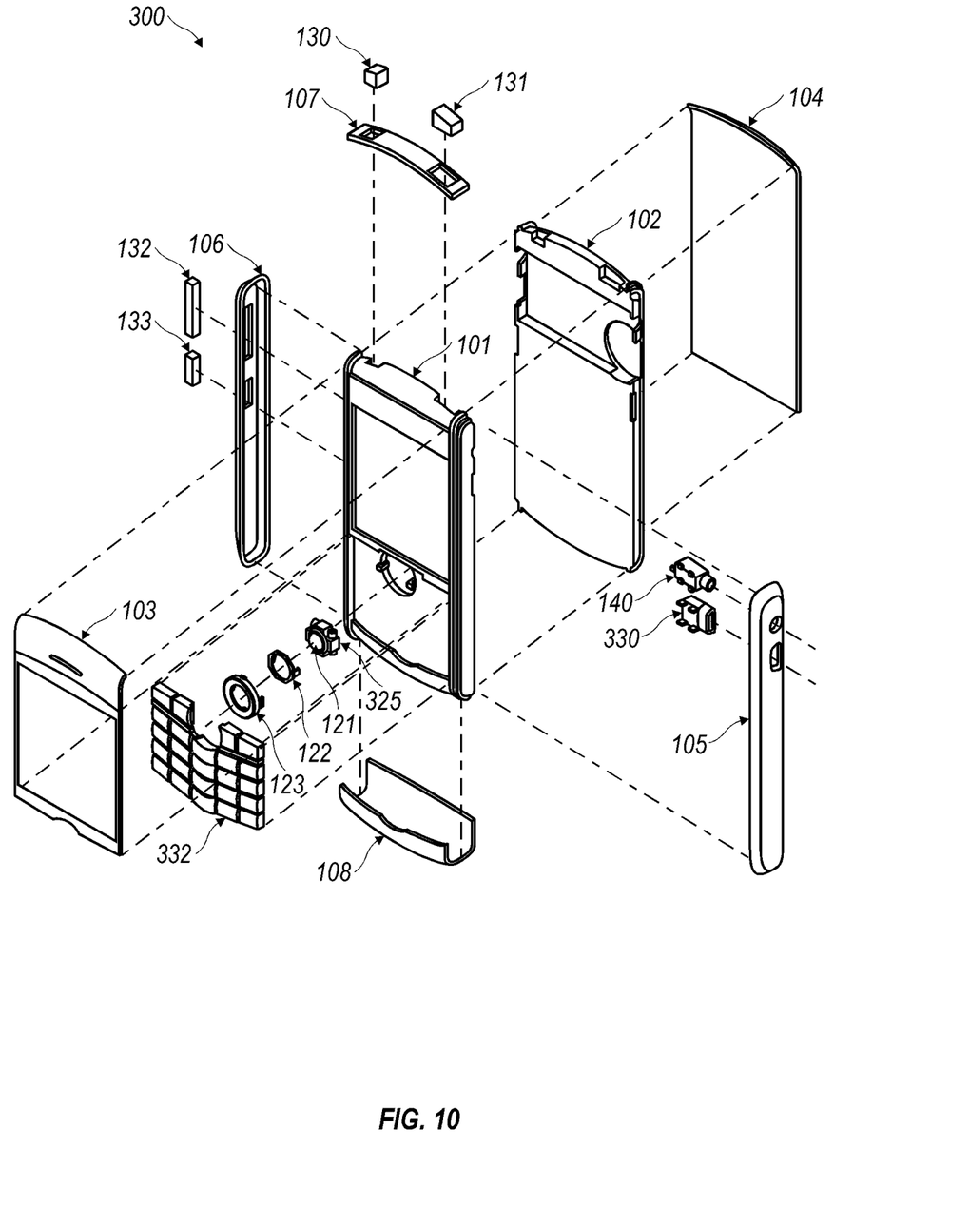
FIG. 10 is an exploded perspective view of an exemplary wireless handheld electronic device, incorporating a trackball assembly as the auxiliary input.
Figure 11:
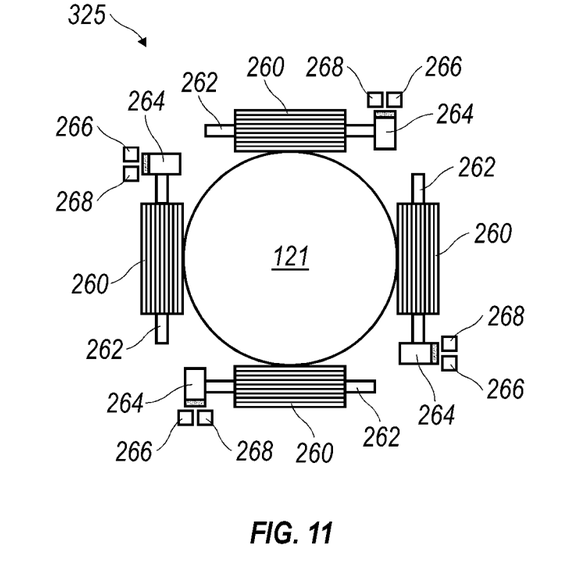
FIG. 11 is a schematic view of a trackball navigation tool assembly as per this disclosure.

The integration of the trackball assembly into the handheld device 300 can be seen in the exploded view of FIG. 10 showing some of the typical components found in the assembly of the handheld electronic device 300. The construction of the device 300 benefits from various manufacturing simplifications. The internal components are constructed on a single PCB (printed circuit board) 102. The keyboard 332 is constructed from a single piece of material, and in a preferred embodiment is made from plastic. The keyboard 332 sits over dome switches (not shown) located on the PCB 102 in a preferred embodiment. One switch is provided for every key on the keyboard in the preferred embodiment, but in other embodiments, more than one switch or less than one switch per key are possible configurations. The support frame 101 holds the keyboard 332 and trackball navigation tool 325 in place above the PCB 102. The support frame 101 also provides an attachment point for the display (not shown). A lens 103 covers the display to prevent damage. When assembled, the support frame 101 and the PCB 102 are fixedly attached to each other and the display is positioned between the PCB 102 and support frame 101.

A serial port (preferably a Universal Serial Bus port) 330 and an earphone jack 140 are fixedly attached to the PCB 102 and further held in place by right side element 105. Buttons 130-133 are attached to switches (not shown), which are connected to the PCB 102.

The trackball navigation tool 325 is frictionally engaged with the support frame 101, but in a preferred embodiment the trackball navigation tool 325 is removable when the device 300 is assembled. This allows for replacement of the trackball navigation tool 325 if/when it becomes damaged or the user desires replacement with a different type of navigation tool. In the exemplary embodiment of FIG. 10, the navigation tool is a ball-based device, i.e., a trackball. When the navigation tool has a ball 121 (i.e., a "rotational member"), the ball 121 itself may be (but need not necessarily be) configured such that it can be removed without removal of the trackball navigation tool. Such removal of the ball 121 would be enabled through the use of an outer removable ring 123 and an inner removable ring 122. These rings 122, 123 ensure that the trackball navigation tool 325 and the ball 121 are securely held in place against the support frame 101.

In at least one embodiment, the present disclosure concerns implementation of trackball navigational tool 325 as illustrated in FIG. 11. In a first aspect, the disclosure features a rotational navigation tool assembly adapted for use in a handheld device 300 to control the motion of a selection or position indicator on a display of the communication device 300. The navigation tool assembly includes a rotational member such as the ball 121 supported for rotation about an axis; a sensor 266, for example a Hall effect sensor, which senses rotation of the rotational member about the axis; and a drag-inducing member, for example electromagnets 268, when activated in response to sensed rotation of the rotational member about the axis, induces rotational drag on the rotational member to restrict rotation of the rotational member about the axis. Suitably, the navigation tool assembly is constructed such that the rotational member is further supported for rotation about a second axis, in which case the navigation tool assembly further includes a sensor which senses rotation of the rotational member about the second axis and may include a second drag-inducing member which, when activated in response to sensed rotation of the rotational member about the second axis, induces rotational drag on the rotational member to restrict rotation of the rotational member about the second axis.

Where the navigation tool is a trackball navigation tool 325, the rotational member rotates about the first and second axes and combinations thereof. In that case, the sensor 266 may include first and second rollers, such as the rollers 260 shown in FIG. 11, against which the rotational member bears, with rotation of the rotational member causing at least one of the rollers 260 to rotate. Furthermore, each of the rollers 260 may have a magnet 264 which rotates when the roller 260 rotates. In the presently described exemplary embodiment, the sensor 266 includes Hall effect sensors to sense rotation of the roller(s) 260 and hence rotation of the rotational member. However, similar sensors may be contemplated by those skilled in the art.

Still further, the drag-inducing member(s) may be electromagnets 268 associated with the rollers 260 which, when energized, magnetically attract the rollers 260 to restrict rotation thereof (and hence rotation of the rotational member). More particularly, the electromagnets 268 may be arranged to attract the magnets 264 on the rollers 260 which are sensed by the Hall effect sensors 266 when the rollers 260 rotate. Alternatively, the drag-inducing members may be piezoelectric members arranged to bear against the rotational member, such as the ball 121, and/or the rollers 260 when actuated.

In an alternate configuration using a trackball, the trackball ball 121 may be made from magnetically attractable material. In that case, a single electromagnet may be provided, which attracts the ball and retards rotation thereof directly.

Figure 12:
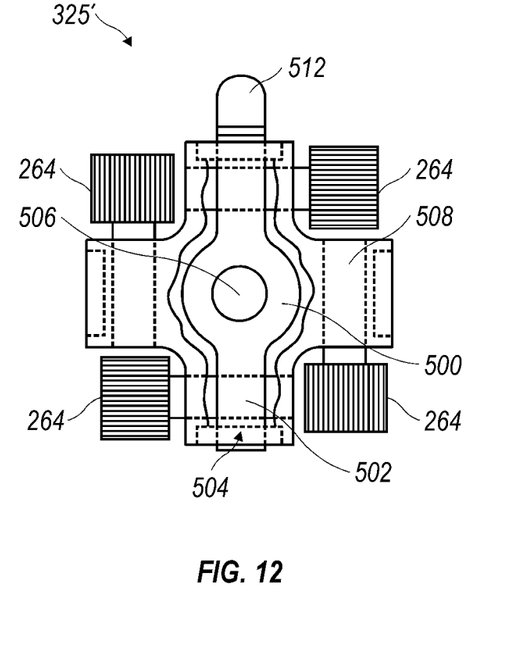
FIG. 12 is a plan view of an alternate configuration of a trackball navigation tool as per this disclosure.
Figure 13:
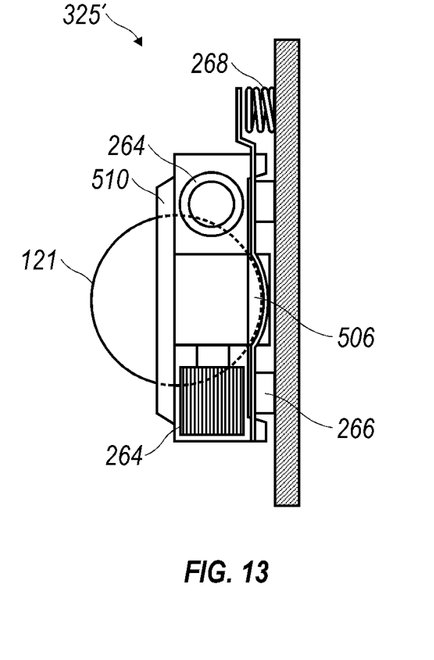
FIG. 13 is a side view of the alternate configuration of a trackball navigation tool shown in FIG. 12.

In a still further configuration using a trackball, a support cradle 500 in which the trackball 121 is rotationally supported can be caused to press the trackball 121 against a retaining member upon actuation of drag-inducing member such as an electromagnet 268 such as a T-coil, a piezoelectric member, or the like.

In another aspect, the disclosure features a handheld device 300 configured to send and receive text messages. The device 300 includes a hand-cradleable body configured to be held in one hand by a user of the device during text entry, a display 322 located on a front face 370 of the body and upon which graphical user interface information is displayed to the user of the device; a key field 650 located on the front face 370 of the body; and a rotational navigation tool assembly. The rotational navigation tool assembly includes a sensor and is used to control the motion of a selection or position indicator on the display 322, and it is adapted to electromagnetically provide to the user tactile feedback associated with movement of the selection or position indicator on the display 322. The handheld device 300 further includes a microprocessor 338 that is adapted to receive user commands from the keys and the rotational navigation tool assembly and to effect corresponding changes to the display. The microprocessor 338 is further adapted to control the electromagnetic provision of the tactile feedback to the user by the rotational navigation tool assembly, for example by controlling the provision and release of electromagnetically induced restriction to rotation of a rotational member constituting part of the navigation tool assembly.

In general, the microprocessor 338 is adapted to sense rotation of the rotational member via the sensor and to cause the selection or position indicator to move on the display in response thereto. More particularly, the microprocessor 338 is suitably adapted 1) to initiate the provision of the electromagnetically induced restriction to rotation after a first predetermined amount of rotation of the rotational member; 2) to cause the selection or position indicator to move on the display 322 in a user-specified direction after a second predetermined amount of rotation of the rotational member; and 3) to cause the release of the restriction to rotation to occur generally concurrently with movement of the selection or position indicator on the display. Even more suitably, the microprocessor 338 is adapted to cause varying degrees (magnitude and/or duration) of restriction to rotation to be applied to the rotational member. For example, the degree of restriction to rotation may vary as a function of the direction of rotation of the rotational member; as a function of the particular application being selected to be run on the device 300; or as a function of the particular graphical user interface icon being selected by the user.

Suitably, such a device 300 utilizes a rotational navigation tool assembly in which drag is electromagnetically induced as set forth above.

In yet another aspect, the disclosure features a handheld device 300 configured to send and receive text messages. The device 300 includes a hand-cradleable body configured to be held in one hand by a user of the device 300 during text entry; a display 322 located on a front face 370 of the body and upon which graphical user interface information is displayed to the user of the device; a key field 650 located on the front face 370 of the body; and a rotational navigation tool assembly. The rotational navigation tool assembly includes a sensor 266 and is used to control the motion of a selection or position indicator on the display 322, and it is adapted to electromechanically (e.g., via piezoelectrics) provide to the user tactile feedback associated with movement of the selection or position indicator on the display 322. The device 300 further includes a microprocessor 338 that is adapted to receive user commands from the keys and the rotational navigation tool assembly and to effect corresponding changes to the display 322. The microprocessor is further adapted to control the electromechanical provision of the tactile feedback to the user by the rotational navigation tool assembly, e.g., by controlling the provision and release of piezoelectrically induced restriction to rotation of a rotational member constituting part of the navigation tool assembly. The microprocessor controls such provision in a manner similar to that described immediately above.

Reverting once again to the drawings, as shown in FIG. 11, the trackball navigation tool assembly 325 includes a ball 121 which is supported to rotate in all directions, i.e., about an X-axis, a Y-axis, and combinations thereof. Two or more rollers 260 (e.g., four as shown) bear frictionally against the surface of the ball 121 and rotate around their own respective axles 262. Thus, rotation of the ball 121 in any direction other than about an axis perfectly perpendicular to a given axle will cause the roller 260 on the given axle to rotate. Each axle 262 has a magnet 264 at an end thereof, which magnet rotates with the roller 260 when the ball 121 rotates. A Hall effect sensor 266 is located near each magnet 264 and senses rotation of the magnet 264, hence rotation of the associated roller 260, and therefore rotation of the ball 121. By sensing and comparing rotation of all the rollers 260, the specific direction and speed of rotation of the ball 121 can be determined, as is known in the art.

In addition to the Hall effect sensors 266, a drag-inducing electromagnet 268 is also located near each magnet 264. The electromagnet 268 may, for example, be a T-coil. When a given electromagnet 268 is energized, it attracts the associated magnet 264, thus retarding rotation of the roller 260 with which the magnet is associated and hence rotation of the ball 121 about an axis that is parallel to the given roller's axle. It will be appreciated that the electromagnets' 268 fields should be shielded from the Hall effect sensors 266 or otherwise processed (as will be explained below) so as not to interfere with sensing by the Hall effect sensors 266.

In another embodiment illustrated in FIGS. 12 and 13, the ball 121 is electromagnetically caused to be retarded from rotating by being "pressed" slightly between its rotational support cradle and a rotational retaining collar. In particular, as is generally known in the art, the trackball navigation tool assembly 325' shown in FIGS. 12 and 13 includes a generally elongated support cradle 500 which is made, for example, from spring steel. The support cradle 500 is cantilever fixed at one end 502 via a hinge member 504 and is otherwise free to flex up or down relative to the hinge member 504. The support cradle 500 further includes a cup-shaped depression 506 in which the ball 121 is seated. A cross shaped frame 508 with a central hole (not visible) and a raised collar 510 surrounding the central hole fits down over the ball 121 to retain the ball in position. With this configuration, which is generally as known in the art, the ball 121 is free to rotate, and it may be depressed slightly against the spring bias of the support cradle to activate a button (not shown) located beneath the ball 121 to indicate a user input.

According to the teaching of this disclosure, the end 512 of the support cradle 500 that is opposite the hinge member 504 extends slightly past the frame 508 to form a tongue. In the illustrated embodiment, an electromagnet 268, such as a T-coil, is located below the tongue, and the tongue has a magnet or magnetic coating (not shown) on it so that when the electromagnet 268 is energized, the tongue is pushed away from the electromagnet 268. Alternatively, the electromagnet 268 can be positioned on the opposite side of the tongue and the support cradle 500 can be made from magnetically attractable material such that when the electromagnet 268 is activated, the tongue is pulled toward the electromagnet 268. In either configuration, when the electromagnet 268 is energized, the ball 121 is pressed more firmly against the collar 510, which causes increased drag and hence retards rotation of the ball 121. A piezoelectric member could be used in place of the electromagnet 268 to electromechanically induce drag on the ball 121 instead.

In another embodiment (not illustrated), the ball 121 may have a core made from magnetically attractable material. In that case, a single electromagnet may be disposed near the ball 121 so as to attract the ball 121 when it (the electromagnet) is energized and hence retard rotation of the ball 121 directly (as opposed to via retardation of rotation of the rollers).

In a still further embodiment (not illustrated), one or more piezoelectric members can be provided adjacent to the trackball 121 and/or associated roller(s). Actuating the piezoelectric members causes them to bear against the trackball 121 and/or rollers, thus creating drag and retarding rotation of the trackball 121 directly and/or indirectly.

With any of the above-described arrangements, the trackball navigation tool 325, 325' can be provided with a magnetically induced or electromechanically induced, drag-based detent effect, as explained shortly below.

Final assembly involves placing the top piece 107 and bottom piece 108 in contact with support frame 101. Furthermore, the assembly interconnects right side element 105 and left side element 106 with the support frame 101, PCB 102, and lens 103. These side elements 106, 105 provide additional protection and strength to the support structure of the device 300. In a preferred embodiment, backplate 104 is removably attached to the other elements of the device.

The block diagram of FIG. 2 representing the device 300 interacting in the communication network 319 shows the device's inclusion of a microprocessor 338 which controls the operation of the device 300. The communication subsystem 311 performs all communication transmission and reception with the wireless network 319. The microprocessor 338 further connects with an auxiliary input/output (I/O) subsystem 328 (e.g., trackball assembly or thumbwheel assembly), a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is a short-range communication subsystem such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld device 300.

The included auxiliary I/O subsystem 328 can take the form of a variety of different navigation tools (multidirectional or single directional) such as a trackball navigational tool 325, a thumbwheel, a navigation pad, or a joystick, just as examples. These navigation tools are preferably located on the front surface of the device 300 but may be located on any exterior surface of the device 300. Other auxiliary I/O devices can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As noted above, the trackball navigation tool assembly 325 of this disclosure can be provided with a magnetically induced or electromechanically induced, drag-based detent effect to provide tactile feedback to the user of the device. In particular, rotation of the ball 121 is sensed by sensors 266 and processed by the microprocessor 338. In response to that sensed rotation of the ball 121, the microprocessor 338 actuates one or more of the drag-inducing electromagnets 268 or piezoelectric members to retard that rotation of the ball 121. Then, when rotation is to be allowed, the microprocessor 338 deactuates the electromagnet(s) or piezoelectrics briefly, which permits the ball 121 to rotate freely to another position, after which further rotation is again retarded. In a particularly preferable application of such operation, the microprocessor 338 controls movement of a selection or position indicator on the display 322 so as to correspond to or coincide with the released, free rotation of the ball 121. ("Selection or position indicator" refers to a screen cursor, highlighting of a screen icon or text, backlighting or "framing" of a screen icon or text, or any other means by which a location of user interaction with the device 300 may be indicated.) Thus, the user of the device 300 will experience a sensation comparable or analogous to traditional thumbwheel clicking which coincides with movement of an indicator.

Figure 14:
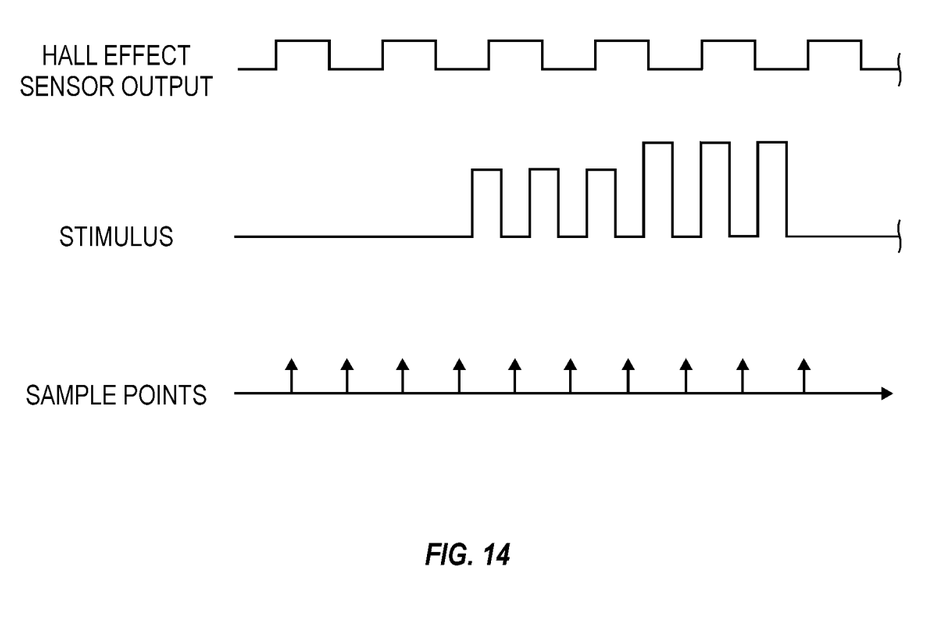
FIG. 14 is a schematic diagram of pulse trains associated with operation of a trackball navigation tool assembly according to the teachings of this disclosure.

Control of the magnetically induced or electromechanically induced, drag-based detent effect by the microprocessor 338 is illustrated schematically in FIG. 14. As the ball 121 rotates, the various Hall effect sensor 266 outputs will be registered by the microprocessor 338 as a series of pulses, as illustrated in the upper pulse train shown in FIG. 14. In general, to avoid erratic or spurious movement of the position or selection indicator, the microprocessor 338 does not cause it to move immediately upon sensing a Hall effect sensor pulse; rather, the microprocessor 338 waits until a few Hall effect sensor pulses are registered before the software interprets the motion of the ball 121 as an intended move. For example, two Hall effect sensor pulses may be received—corresponding, for example, to a quarter turn of the ball 121—before the microprocessor interprets the motion of the ball 121 as indicating desired indicator motion. At that point, the microprocessor 338 causes the drag-inducing electromagnet(s) or piezoelectric members to be activated so as to retard rotation of the ball 121, as indicated by the rising stimulus pulses in the middle pulse train shown in FIG. 14. Subsequently, after a few more Hall effect sensor pulses—the ball 121 can still be rotated while under the influence of the electromagnet(s) or piezoelectric members; it will just be slightly more difficult to do so—the microprocessor causes the drag-inducing members to be deactuated briefly, thus releasing drag on the ball 121 temporarily and allowing it to move easily to its next incremental position, and simultaneously causes the position or selection indicator to move to the next incremental position on the display 322. By repeating this process of turning the drag-inducing electromagnet(s) or piezoelectrics on and off repeatedly, the microprocessor causes the ball 121 to move with a magnetically induced or electromechanically induced, drag-based clicking or detent "feel" to it.

Furthermore, in a particularly preferred implementation, the degree (magnitude and/or duration) of resistance to rotation of the ball 121 can be varied, as indicated by the higher-level stimulus pulses in the middle pulse train shown in FIG. 14. This can useful, for example, to slow rotation of the ball 121 even more as a "key" (e.g., most often used, most overall-controlling, etc.) menu item, icon, application, etc. is approached by the position/selection indicator on the display screen. Alternatively, depending on the specific application being run on the device 300 (for example, a photo editing program or map program), it may be desirable for resistance to rotation to be removed altogether, in which case the ball 121 and position/selection indicator would both move smoothly and continuously.

It should be appreciated that although the stimulation is illustrated in a digital fashion, such stimulation could also be implemented in an analog fashion, with the magnitude of resistance to rotation ramping up and down. Furthermore, it should be appreciated that these drag-based detent concepts and implementations can be applied to other rotational navigation tools besides just trackballs, such as thumbwheels or the like.

As noted above, when the drag-inducing member is an electromagnet (e.g., a T-coil), steps should be taken to prevent the magnetic field from interfering with the Hall effect sensors. For example, magnetic shielding could be provided between the T-coil(s) and the Hall effect sensors. Alternatively, magnets in addition to those sensed by the Hall effect sensors could be provided on the axles, located remote from the Hall effect sensors, and the T-coils located in proximity to those additional magnets. Still further, as illustrated by the relative positions of the three pulse trains in FIG. 14, the microprocessor 338 could be programmed such that the stimulus actuation pulses are applied at times when the Hall effect sensor outputs are not being sampled; that avoids the magnetic field "ambiguity" issue altogether.

In a preferred embodiment, the handheld device 300 is designed to wirelessly connect with a communication network 319. Some communication networks that the handheld device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application, or parts thereof may be loaded in RAM 326 or other volatile memory.

Furthermore, the device is equipped with components to enable operation of various programs, as shown in FIG. 2. In an exemplary embodiment, the flash memory 324 is enabled to provide a storage location for the operating system, device programs 358, and data. The operating system is generally configured to manage other application programs 358 that are also stored in memory 324 and executable on the processor 338. The operating system honors requests for services made by application programs 358 through predefined application program 358 interfaces. More specifically, the operating system typically determines the order in which multiple applications 358 executed on the processor 338 and the execution time allotted for each application 358, manages the sharing of memory 324 among multiple applications 358, handles input and output to and from other device subsystems 342, and so on. In addition, users can typically interact directly with the operating system through a user interface usually including the keyboard 332 and display screen 322. While the operating system in a preferred embodiment is stored in flash memory 324, the operating system in other embodiments is stored in read-only memory (ROM) or similar storage element (not shown). As those skilled in the art will appreciate, the operating system, device application 358 or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks, generally described as packet-switched, narrow-band, data-only technologies which are mainly used for short burst wireless data transfer. For the systems listed above, the handheld device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different handheld devices 300. The handheld device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled handheld device 300, two-way communication between the handheld device 300 and communication network 319 is possible.

If the handheld device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the handheld device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the handheld device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Exemplary embodiments have been described hereinabove regarding both wireless handheld electronic devices, as well as the communication networks within which they cooperate. It should be appreciated, however, that a focus of the present disclosure is the enablement of a feedback system associated with a rotational member of an auxiliary user input device, such as a trackball.

What is claimed is:

1. A handheld electronic communication device having one or more software applications thereon, the handheld electronic communication device having a navigation tool assembly that is manipulated by a user to control movement of a selection or position indicator on a display of the handheld electronic communication device, the handheld electronic communication device comprising:
    a rotational member;
    a support structure that enables the rotational member to rotate about a plurality of axes;
    a sensor which senses rotation of the rotational member about a first axis and generates sensor electrical signals;
    a microprocessor that communicates with the sensor and executes the one or more software applications running on the handheld electronic device, the microprocessor including computer instructions, which upon execution, cause the microprocessor to:
        receive the sensor electrical signals;
        enable selection of a first application, the first application having first properties for controlling the rotational member to facilitate navigation of the selection or position indicator on the display, the first properties identifying a frequently selected menu item or icon of the first application having a first importance value above a threshold;
        enable selection of a second application, the second application having second properties for controlling the rotational member to facilitate navigation of the selection or position indicator on the display, the second properties identifying a frequently selected menu item or icon of the second application having a second importance value above the threshold, the second properties being different than the first properties; and
        generate navigation electric signals in response to the sensor electrical signals, the navigation electric signals being generated using one of the first properties or the second properties; and
    a first drag-inducing member that receives the navigation electric signals to actuate and deactuate a rotational drag force on the rotational member, the rotational drag force restricting rotation of the rotational member about the first axis in order to restrict a range of freedom of the rotational member from the plurality of axes based on the threshold and at least one of the first importance value and the second importance value to facilitate navigation of the selection or position indicator to a next incremental menu item or icon presented on the display by a selected application run on the device.

2. The handheld electronic communication device according to claim 1, wherein the first drag-inducing member comprises an electromagnet.

3. The handheld electronic communication device according to claim 1, wherein the first drag-inducing member comprises a piezoelectric member.

4. The handheld electronic communication device according to claim 1, wherein the support structure enables the rotational member to rotate about a second axis that is different from the first axis, the handheld electronic communication device further comprising:
    a second sensor that senses rotation of the rotational member about the second axis; and
    a second drag-inducing member that receives the navigation electric signals to actuate and deactuate a second rotational drag force on the rotational member to control rotation of the rotational member about the second axis in order to restrict the range of freedom of the rotational member from the plurality of axes to facilitate navigation of the selection or position indicator to the next incremental menu item or icon presented on the display by the selected application run on the device.

5. The handheld electronic communication device according to claim 4, wherein the rotational member is a trackball that rotates freely.

6. The handheld electronic communication device according to claim 4, wherein the first and second drag-inducing members comprise first and second rollers, respectively, that engage the rotational member and receive a rotational force imparted from the rotational member to cause at least one of the rollers to rotate.

7. The handheld electronic communication device according to claim 6, wherein the first and second drag-inducing members each comprise a magnet positioned to rotate about a same axis as the corresponding roller, and wherein the sensor and second sensor are Hall effect sensors that sense rotation of the corresponding magnet to detect rotation of the rotational member.

8. The handheld electronic communication device according to claim 7, wherein the first and second drag-inducing members further comprise first and second electromagnets positioned proximate to the corresponding first and second rollers, respectively, the first and second electromagnets being configured to magnetically attract the corresponding ones of the first and second rollers to restrict rotation thereof.

9. The handheld electronic communication device according to claim 7, wherein the first and second drag-inducing members further comprise first and second electromagnets positioned proximate to the magnets that correspond with the first and second rollers, respectively, the first and second electromagnets being configured to magnetically attract the corresponding magnet to restrict rotation of the first and second rollers.

10. The handheld electronic communication device according to claim 4, further comprising:
a third sensor that senses rotation of the rotational member about a third axis; and
a third drag-inducing member that receives navigation electric signals to actuate and deactuate a third rotational drag force on the rotational member to restrict rotation of the rotational member about the third axis.

11. The handheld electronic communication device according to claim 10, wherein the rotational member is a trackball that rotates freely.

12. The handheld electronic communication device according to claim 10, wherein the first, second and third drag-inducing members comprise first, second and third rollers, respectively, that engage the rotational member and receive a rotational force imparted from the rotational member to cause at least one of the rollers to rotate.

13. The handheld electronic communication device according to claim 12, wherein the first, second and third drag-inducing members comprise a magnet positioned to rotate about a same axis as the corresponding roller, and wherein the sensor is a Hall effect sensor that senses rotation of the corresponding magnet to detect rotation of the rotational member.

14. The handheld electronic communication device according to claim 4, wherein the rotational member comprises a magnetically attractable material and the first drag-inducing member comprises an electromagnet which, when energized, magnetically attracts the magnetically attractable rotational member to restrict rotation thereof about at least one of the first and second axes.

15. The handheld electronic communication device according to claim 1, further comprising:
a retaining member that is mechanically coupled to the support structure, the support structure including:
a cradle that biases the rotational member against the retaining member, the first drag-inducing member being actuable to increase a bias force applied to the cradle to bias the rotational member against the retaining member, thereby increasing a rotational drag force on the rotational member.

16. The handheld electronic communication device according to claim 15, wherein the first drag-inducing member further comprises an electromagnet.

17. The handheld electronic communication device according to claim 16, wherein the first drag-inducing member is a piezoelectric member.

18. A handheld electronic communication device having one or more software applications thereon, the handheld electronic communication device comprising:
a body;
a display located on a front face of the body and upon which graphical user interface information is displayed;
a key field located on the front face of the body, the key field including a plurality of keys selected from a plurality of alphanumeric input keys and at least one menu key;
a navigation tool assembly adapted for manipulation by a user to control movement of a selection or position indicator on the display, the navigation tool assembly comprising:
a rotational member;
a support structure that enables the rotational member to rotate about a plurality of axes;
a sensor that senses rotation of the rotational member about a first axis and generates sensor electrical signals;
a first drag-inducing member that receives navigation electric signals to actuate and deactuate a first electromagnetic force to control rotation of the rotational member about the first axis in order to restrict a range of freedom of the rotational member from the plurality of axes to facilitate navigation of the selection or position indicator to a next incremental menu item or icon presented on the display by a selected application run on the device; and
a microprocessor that communicates with the sensor, the first drag-inducing member, and the one or more software applications running on the handheld electronic device, the microprocessor including computer instructions, which upon execution, cause the microprocessor to:
receive the sensor electrical signals;
receive electrical signals from the alphanumeric input keys and the menu key upon actuation thereof;
enable selection of a first application, the first application having first properties for controlling the rotational member to facilitate navigation of the selection or position indicator on the display, the first properties identifying a frequently selected menu item or icon of the first application having a first importance value above a threshold;
enable selection of a second application, the second application having second properties for controlling the rotational member to facilitate navigation of the selection or position indicator on the display, the second properties identifying a frequently selected menu item or icon of the second application having a second importance value above the threshold, the second properties being different than the first properties;
generate the navigation electric signals in response to the sensor electrical signals, the navigation electric signals being generated using one of the first properties or the second properties to provide a degree of restriction to rotation of the rotational member based on the selected application run on the device; and
exert a drag force on the rotational member through the first drag-inducing member based on the threshold and at least one of the first importance value and the second importance value, the drag force providing tactile feedback to the user by magnetically restricting rotation of the rotational member.

19. The handheld electronic communication device according to claim 18, wherein the first drag-inducing member comprises an electromagnet that induces the electromagnetic force to restrict rotation of the rotational member about the first axis to provide the tactile feedback.

20. The handheld electronic communication device according to claim 19, wherein the microprocessor electrically communicates with the sensor and the first drag-inducing member to restrict rotation of the rotational member and to facilitate navigation of the selection or position indicator on the display.

21. The handheld electronic communication device according to claim 20, wherein the microprocessor further includes computer instructions, which upon execution, cause the microprocessor to:
   introduce a first delay corresponding to a first predetermined amount of rotation of the rotational member before initiating the electromagnetic force to restrict rotation of the rotational member;
   introduce a second delay corresponding to a second predetermined amount of rotation of the rotational member before navigating the selection or position indicator on the display in a user-specified direction; and
   modify the electromagnetic force to release the rotation restriction concurrently with movement of the selection or position indicator on the display.

22. The handheld electronic communication device according to claim 21, wherein the first predetermined amount of rotation is greater than zero.

23. The handheld electronic communication device according to claim 18, wherein the microprocessor further includes computer instructions, which upon execution, cause the microprocessor to remove, from the navigation electric signals, the degree of restriction to rotation of the rotational member.

24. The handheld electronic communication device according to claim 18, wherein the microprocessor further includes computer instructions, which upon execution, cause the microprocessor to modify the navigation electric signals to provide the degree of restriction to rotation of the rotational member based on a direction of rotation of the rotational member.

25. The handheld electronic communication device according to claim 18, wherein the microprocessor performs operating system functions including executing the one or more software applications.

26. The handheld electronic communication device according to claim 18, wherein the microprocessor is adapted to provide graphical user interface icons on the display and enable selection of a graphical user interface icon, wherein the microprocessor further includes computer instructions, which upon execution, cause the microprocessor to modify the navigation electric signals to provide the degree of restriction to rotation of the rotational member based on the selected graphical user interface icon.

27. The handheld electronic communication device according to claim 19, wherein the first drag-inducing member comprises a roller that engages the rotational member and receives a rotational force imparted from the rotational member to cause the roller to rotate.

28. The handheld electronic communication device according to claim 27, wherein the support structure enables the rotational member to rotate about a second axis that is different than the first axis, the navigation tool assembly further comprises:
   a second sensor that senses rotation of the rotational member about the second axis; and
   a second drag-inducing member that receives the navigation electric signals to actuate and deactuate a second electromagnetic force to control rotation of the rotational member about the second axis in order to restrict the range of freedom of the rotational member from the plurality of axes to facilitate navigation of the selection or position indicator to the next incremental menu item or icon presented on the display by the selected application run on the device.

29. The handheld electronic communication device according to claim 28, wherein the first and second drag-inducing members comprise first and second rollers, respectively, that include a corresponding magnet positioned to rotate about a same axis as the corresponding roller, and wherein the sensor and second sensor are Hall effect sensors that sense rotation of the corresponding magnet to detect rotation of the rotational member.

30. The handheld electronic communication device according to claim 29, wherein the first and second drag-inducing members further comprise first and second electromagnets positioned proximate to the corresponding first and second rollers, respectively, the first and second electromagnets being configured to magnetically attract the corresponding ones of the first and second rollers to restrict rotation thereof.

31. The handheld electronic communication device according to claim 29, wherein the first and second drag-inducing members further comprise first and second electromagnets positioned proximate to the magnets that correspond with the first and second rollers, respectively, the first and second electromagnets being configured to magnetically attract the corresponding magnet to restrict rotation of the first and second rollers.

32. The handheld electronic communication device according to claim 27, wherein the rotational member comprises a magnetically attractable material and the first drag-inducing member comprises an electromagnet which, when energized, magnetically attracts the magnetically attractable rotational member to restrict rotation thereof.

33. The handheld electronic communication device according to claim 18, wherein the alphanumeric input keys comprise the plurality of alphabetic keys having letters associated therewith are arranged in a QWERTY, QWERTZ, AZERTY, or DVORAK arrangement.

34. A handheld electronic communication device having one or more software applications thereon, the handheld electronic communication device comprising:
   a body;
   a display located on a front face of the body and upon which graphical user interface information is displayed;
   a key field located on the front face of the body, the key field including a plurality of keys selected from a plurality of alphanumeric input keys and at least one menu key;
   a navigation tool assembly adapted for manipulation by a user to control movement of a selection or position indicator on the display, the navigation tool assembly comprising:
      a rotational member;
      a support structure that enables the rotational member to rotate about a plurality of axes;
      a sensor that senses rotation of the rotational member about a first axis and generates sensor electrical signals; and
      a first drag-inducing member that receives navigation electric signals to actuate and deactuate an electromechanical force to control rotation of the rotational member about the first axis in order to restrict a range of freedom of the rotational member from the plurality of axes to facilitate navigation of the selection or position indicator to a next incremental menu item or icon presented on the display by a selected application run on the device; and a microprocessor that communicates with the sensor, the first drag-inducing member, and the one or more software applications running on the handheld electronic device, the microprocessor including computer instructions, which upon execution, cause the microprocessor to:

receive the sensor electrical signals;

receive electrical signals from the alphanumeric input keys and the menu key upon actuation thereof;

enable selection of a first application, the first application having first properties for controlling the rotational member to facilitate navigation of the selection or position indicator on the display, the first properties identifying a frequently selected menu item or icon of the first application having a first importance value above a threshold;

enable selection of a second application, the second application having second properties for controlling the rotational member to facilitate navigation of the selection or position indicator on the display, the second properties identifying a frequently selected menu item or icon of the second application having a second importance value above the threshold, the second properties being different than the first properties;

generate the navigation electric signals in response to the sensor electrical signals, the navigation electric signals being generated using one of the first properties or the second properties to provide a degree of restriction to rotation of the rotational member based on the selected application run on the device; and exert a drag force on the rotational member through the first drag-inducing member based on the threshold and at least one of the first importance value and the second importance value, the drag force providing tactile feedback to the user by mechanically restricting rotation of the rotational member.

35. The handheld electronic communication device according to claim 34, wherein the first drag-inducing member comprises an electromechanical member that induces electromechanical force to restrict rotation of the rotational member about the first axis to provide the tactile feedback.

36. The handheld electronic communication device of claim 35, wherein the electromechanical member is a piezoelectric member configured and disposed to induce electromechanical force to restrict rotation of the rotational member.

37. The handheld electronic communication device of claim 34, wherein the alphanumeric input keys comprise the plurality of alphabetic keys having letters associated therewith are arranged in a QWERTY, QWERTZ, AZERTY, or DVORAK arrangement.

* * * * *